Dec. 27, 1960  W. R. SANDERSON  2,966,107
PHOTOGRAPHIC CAMERA AND ADAPTER FOR MOUNTING SAME
Filed April 14, 1958

INVENTOR.
WILLIAM R. SANDERSON
BY
ATTORNEY

2,966,107
PHOTOGRAPHIC CAMERA AND ADAPTER FOR MOUNTING SAME

William R. Sanderson, Irondequoit, N.Y., assignor to Graflex, Inc., Rochester, N.Y., a corporation of Delaware Filed Apr. 14, 1958, Ser. No. 728,470

4 Claims. (Cl. 95—86)

The present invention relates to photographic cameras, and more particularly to an adapter for securing a camera to a tripod or other support.

Conventional cameras have a threaded hole in their bottom walls or in their beds; and conventional tripod heads carry a screw that is threaded into the hole in the bottom or bed of the camera to secure the camera detachably to the tripod. With the conventional construction it takes several seconds to secure a camera to a tripod or to remove a camera therefrom.

One object of the present invention is to provide an adapter which can be used for quickly securing a camera to a tripod head or other support, and which will also enable the camera to be removed quickly from the support.

Another object of the invention is to provide a device of the character described which will in use hold the camera securely to the tripod or other support.

A further object of the invention is to provide a device of the character described which is simple in construction, which is light in weight, and easily portable, and which has no projections or other parts that when in use might in any way interfere with the operation of the camera.

Still another object of the invention is to provide a camera adapter combination that will enable a camera to be mounted on, and removed from, a tripod or other support more easily and more rapidly than is possible with conventional structure.

Other objects of the invention will be apparent hereinafter from the specification and from the recital of the appended claims.

Figure 1:
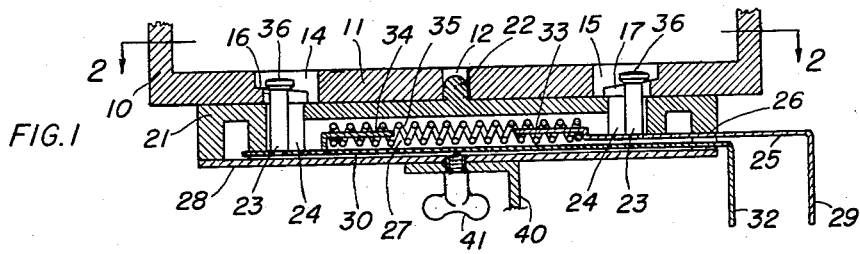
Fig. 1 is a fragmentary vertical section showing a camera body and a tripod adapter made according to one embodiment of the present invention.
Figure 2:
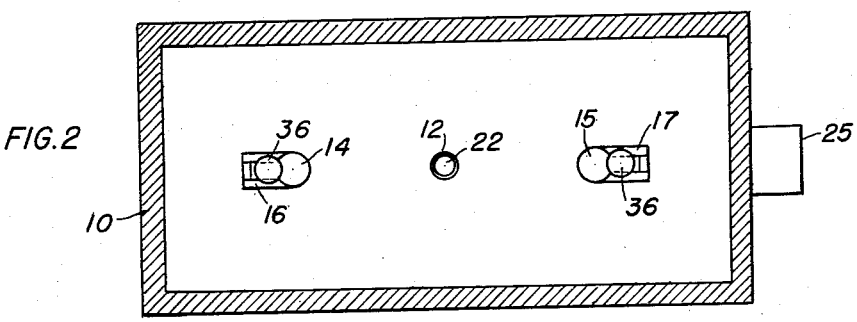
Fig. 2 is a section on the line 2—2 of Fig. 1 looking in the direction of the arrows.
Figure 3:
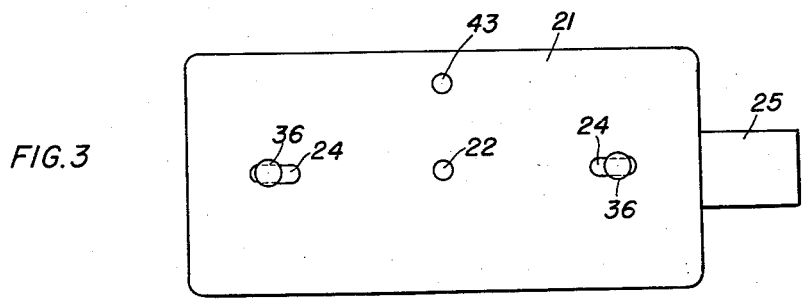
Fig. 3 is a top view of the adapter itself.
Figure 4:
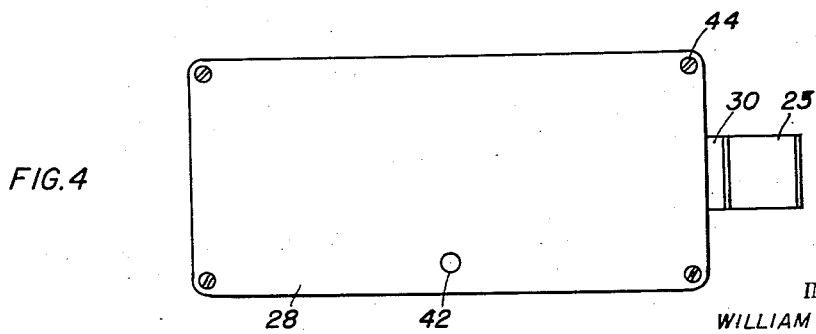
Fig. 4 is a bottom plan view of the adapter.

Referring now to the drawing by numerals of reference, 10 denotes the body of a camera, or, in the case of a folding camera, it may denote the bed of the camera. The base 11 of the camera body or bed has a hole or socket 12 in it, and has, at opposite sides of this hole and in line therewith two keyhole slots 14 and 15. The larger parts of the two slots are proximate, while the shank portions thereof are distal from one another. The slots have ledges 16 and 17, respectively, along opposite side walls thereof which bound the shank portions of the slots and which incline downwardly from the distal ends of the slots to the large ends thereof.

The adapter comprises a body portion 21, which is recessed to provide a chamber 27, that is closed by a bottom plate or cover 28. The body portion 21 has a locating boss or teat 22 projecting upwardly therefrom that is adapted to engage in the hole or socket 12 in the base of the camera body to center the camera on the adapter and to prevent the camera from sliding on the adapter. Slidably mounted in the body portion 21 of the adapter are two studs 23. These studs are adapted to engage in the keyhole slots 14 and 15 of the camera, and are adapted to move in spaced, aligned slots 24 formed in the body of the adapter.

One of the studs 23 is riveted to a bar 25 that slides in the chamber 27 and that projects outwardly of the adapter through a slot 26 formed in one end wall of body 21. The bar 25 has its outer projecting end turned downwardly as denoted at 29 to provide a gripping portion for the bar. The other stud 23 is riveted to a bar 30 which also slides in the chamber 27 parallel to bar 25, and which extends outwardly of the body portion of the adapter through the slot 26. The projecting end of this bar 30 is also turned downwardly, as denoted at 32.

The bar 25 has an offset portion 33 at its inner end. The bar 30 has an offset portion 34 struck up from it in opposed alignment with the offset portion 33 of the bar 25. Mounted on and interposed between the offset portions 33 and 34 of the two bars is the coil compression spring 35, which normally presses the two studs 23 away from one another toward the distal ends of the two slots 14 and 15 in which they engage.

In use, the adapter 20 may be secured to the head or bracket 40 of a conventional tripod by a thumb screw 41 which threads into the aligned holes 42 and 43 of the plate 28 and body portion 21, respectively, of the adapter. The camera is located on the adapter by inserting the stud or teat 22 into the socket or recess 12 in the camera body or bed while squeezing the depending portions 29 and 32 of the two bars 25, 30 together so that the heads of the two studs 23 can be inserted through the keyhole slots 14 and 15 in the camera body or bed. When the slides or bars 25 and 30 are released, the compression spring 35 forces the heads 36 of the studs along the inclined plane surfaces 16 and 17 of the ledges, thereby wedging the camera tightly against the adapter. The stud or teat 22 prevents the camera from sliding on the adapter so that the studs 23 are required only to maintain engagement of the camera with the adapter in tension.

To remove the camera from the adapter, again, the photographer merely presses the depending portions 32 and 29 of the bars 25 and 30 together against the resistance of the spring 35, to bring the heads 36 of the studs into the large diameter portions of the keyhole slots, and lifts the camera upwardly off the adapter.

With the present construction, it is possible, therefore, quickly to put a camera on, or to remove it from a tripod. Moreover, with the device of the present invention, the camera is held firmly and securely to the tripod through the intermediation of the adapter. Vibrations only cause the spring 35 to urge the studs 23 tighter into engagement with the inclined ledges 17 of the slots 15 thereby to clamp the camera the more securely to the adapter.

Another advantage of the present invention is that the cost is primarily that of the adapter, and there are no projections or pieces, that are likely to become loose, required on the bottom of the camera.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. An adapter for securing a camera to a support, comprising a casing, a pair of studs reciprocably mounted in said casing for movement toward and from one another rectilinearly and projecting upwardly outside said casing, a pair of plates reciprocable rectilinearly in said casing and to which said studs are secured, respectively, one of said plates being superposed above the other, and a spring interposed between said plates and constantly urging said studs away from one another to clamping position, said plates projecting outside said casing at one end thereof, the outwardly-projecting portions of said plates having parallel downturned ends disposed to be grasped to move said studs toward one another against the resistance of said spring.

2. The combination with a camera having a pair of aligned longitudinally-spaced keyhole slots therein, each of which is wider at one end than at its other end, said slots being disposed so that their wider ends are proximal, of an adapter for securing said camera to a support, said adapter comprising a casing on which said camera is adapted to seat, a pair of headed studs projecting outwardly of said casing to engage, respectively, in said keyhole slots, a spring interposed between said studs to constantly urge said studs away from one another to secure said camera to said adapter, and means for manually moving said studs toward one another to permit removal of the camera from the adapter.

3. The combination with a camera having a pair of aligned, longitudinally-spaced keyhole slots therein, each of which is wider at one end than at its other end, of an adapter for securing the camera to a support, said adapter comprising a casing on which said camera is adapted to seat, a pair of headed studs projecting outwardly of said casing to engage, respectively, in said keyhole slots, a pair of plates to which the respective studs are secured, said plates being superposed one above the other and being reciprocable in said casing in parallelism to one another and projecting outwardly through one end of said casing, a spring interposed between said plates to constantly urge said studs toward the smaller ends of said slots to secure said camera to said adapter, and means secured to the outwardly projecting ends of said plates for manually moving said plates to move said studs toward the larger ends of said slots to release the camera from the adapter.

4. The combination with a camera having a pair of aligned, longitudinally-spaced keyhole slots therein, each of which is wider at one end than at its other end, and each of which has ledges at its opposite sides which incline downwardly from the narrow to the large end of the slot, of an adapter for securing the camera to said support, said adapter comprising a casing on which the camera is adapted to seat, a pair of headed studs projecting outwardly of said casing to engage, respectively, in said keyhole slots, a pair of plates, to which the respective studs are secured, said plates being superposed one above the other and being reciprocable in said casing in parallelism to one another and projecting outwardly through one end of said casing, a spring interposed between said plates to constantly urge said studs away toward the narrow ends of said slots to pull the camera down on the adapter and to secure the camera to the adapter, and said plates having their outwardly projecting ends downturned whereby the downturned ends may be grasped to move said studs toward the large ends of said slots against the resistance of said spring to release the camera from the adapter.

References Cited in the file of this patent

UNITED STATES PATENTS

| | | |
|---|---|---|
| 517,360 | Perry | Mar. 27, 1894 |
| 1,259,397 | Hathaway | Mar. 12, 1918 |
| 1,647,986 | Dickinson | Nov. 8, 1927 |
| 1,699,730 | Woolf | Jan. 22, 1929 |
| 1,760,784 | Skarke | May 27, 1930 |